United States Patent [19]
Triantafyllou et al.

[11] Patent Number: 5,740,750
[45] Date of Patent: Apr. 21, 1998

[54] METHOD AND APPARATUS FOR REDUCING DRAG ON A MOVING BODY

[75] Inventors: Michael Triantafyllou, Belmont; David S. Barrett, Needham, both of Mass.

[73] Assignee: Massachusetts Institute of Technology, Cambridge, Mass.

[21] Appl. No.: 652,673

[22] Filed: May 28, 1996

[51] Int. Cl.⁶ .................................................. B63B 1/34
[52] U.S. Cl. ........................................ 114/67 R; 440/13
[58] Field of Search ..................... 440/13–16; 114/67 A

[56] References Cited

U.S. PATENT DOCUMENTS

| | | | |
|---|---|---|---|
| 1,458,844 | 6/1923 | Perkins | 114/332 |
| 2,936,729 | 5/1960 | Kuttner | 114/67 A |
| 5,359,574 | 10/1994 | Nadolink | 367/1 |
| 5,401,196 | 3/1995 | Triantafyllou | 440/13 |

FOREIGN PATENT DOCUMENTS

| | | |
|---|---|---|
| 30075 E | 1/1926 | France . |
| 2164535 A | 8/1973 | France . |
| 301446 C | 5/1915 | Germany . |
| 3423405 A | 1/1986 | Germany . |
| 1509095 | 9/1989 | U.S.S.R. ........................... 440/15 |
| 2 223 821 | 4/1990 | United Kingdom . |

OTHER PUBLICATIONS

M.S. Triantafyllou et al,"An Efficient Swimming Machine", Mar. 1995, vol. 272, No. 3, pp. 1–8, Scientific American.

*Primary Examiner*—Jesus D. Sotelo
*Attorney, Agent, or Firm*—Wolf, Greenfield & Sacks, P.C.

[57] ABSTRACT

A method and apparatus for providing reduced drag on a body moving in a direction D through a selected fluid medium at a speed U which is normally sufficient to cause turbulence. Reduced drag is generally accomplished by flexing at least the outer surface of at least the rear third of the body to produce a wave-like motion of the body having a wavelength of between 0.5 and 2.0 times the length of the body, a reduced frequency value $\Omega$ between 0.1 and 0.5 and a time delay between successive points on the body reaching peaks for their flex motion which is directly proportional to the distance $x_i$ in the direction D of the point from a reference point on the body and inversely proportional to the phase speed $c_p$ of the wave. A variety of techniques are described for achieving the desired wave-like motion.

24 Claims, 12 Drawing Sheets

METHOD AND APPARATUS FOR REDUCING DRAG ON A MOVING BODY

This invention was made with government support under grant numbers N00014-92-J-1726 awarded by the Department of the Navy and NA46RG0434 awarded by the Department of Commerce. The government has certain rights in the invention.

FIELD OF THE INVENTION

This invention relates to methods and apparatus for reducing drag on a body moving through a selected medium and more particularly to such a method and apparatus which actively oscillates the surface of the body to reduce turbulence along the body.

BACKGROUND OF THE INVENTION

Every body moving in air, water, or other fluid medium is subject to a retarding force from the fluid, which retarding force is referred to as "the drag force", or merely as "drag". Drag is a function of (a) the velocity at which the body is moving; (b) the body's shape; © the quality of the body surface; (d) turbulence in the flow around the body; and (e) the viscosity of the fluid medium in which the body is moving. Since energy, frequently substantial energy, must be expended to overcome this drag force in order to keep the body moving at a desired velocity, it is desirable that this drag force be minimized. Heretofore, efforts to reduce drag have concentrated on streamlining the shape of the body and on smoothing or otherwise changing the quality of the external surface of the body. For example, modest reductions in drag (5% or less) can be achieved by such changes in the body surface as the use of parallel shallow longitudinal grooves in the after body of a streamlined body. However, even when these passive steps are taken, significant turbulence still exists in the medium at various places along the body, and the resulting drag on the body still makes a significant contribution to the energy required in order to maintain desired movement of the body.

A critical parameter for purposes of drag is the Reynolds number, $R_e$, which is directly proportional to the velocity U of the body in the direction D in which the body is moving and to the length L of the body and is inversely proportional to the kinematic viscosity ν of the medium (i.e., $R_e=UL/v$). When $R_e$ exceeds a value which is normally in the range of roughly 400,000–500,000, but may be somewhat above or below that range depending on the parameters of the body and of the medium, flow around the body will become turbulent (i.e., instead of flowing smoothly around the body, the flow will contain random disturbances which cause drag to increase many-fold). Unfortunately, the value of $R_e$ at which turbulence occurs is exceeded in almost all cases of practical interest. For example, a car moving at as little as 3 miles per hour has already exceeded the $R_e$ value required for turbulence to occur and a ship or plane will exceed this value for any measurable speed.

As a result, significant efforts have been expended to smooth out turbulence and make the flow around the body laminar. This is important since, if it were possible to eliminate turbulence completely, it could in many instances result in a reduction of approximately 90% in drag on the body, reducing fuel cost for moving the body tremendously. Reduced drag can also permit smaller, lighter and less expensive engines or other drive mechanisms to be utilized, further reducing fuel costs, and also reducing manufacturing costs, and can be particularly critical for human powered craft, permitting the human operator to conserve energy and therefore to be able to travel longer and further. In addition, drag in general, and turbulence in particular, cause noise which is undesirable, particularly for submersible crafts used for marine research or for war.

While some efforts have been made to reduce turbulence induced drag, particularly in marine situations, such efforts have had at best limited success. Such efforts have for example involved using suction of the boundary layer by for example providing a suction device close to the surface of the body to remove the turbulent part of the flow, such turbulence always being in contact with the body. While this does laminarize the flow locally, the effects are limited and the installation of suction devices is expensive. Another technique involves the injection of chemical substances, such as polymers, which laminarize the flow; however, large amounts of such substances are needed and this method is therefore awkward to use. Still other methods involve active manipulation of the flow. However, these methods are still in the experimental stage, and so far, such methods, while reducing one part of the drag force, amplify other parts, so that none has clearly demonstrated an overall drag reduction.

Therefore, a need exists for a technique which is convenient to implement and which is effective to reduce drag on a vessel or other body moving in a medium such as water or air by a substantial amount, preferably greater than 50%. The technique should work whether the body is being towed, or whether the body is being self propelled, either by some type of engine or other mechanical propulsor or by human power.

SUMMARY OF THE INVENTION

In accordance with the above, this invention reduces drag on a body moving through a fluid medium by reducing turbulence at the surface of the body in much the same way that this objective is accomplished by a swimming fish; namely by active control of lateral body flexing. More specifically, for a body having a length L being moved in a direction D through a selected fluid medium at a speed U which would normally be sufficient to create turbulence, the turbulence, and thus the drag on the body, is reduced by flexing at least the outer surface of at least the rear portion of the body to produce a wave-like motion thereof having certain characteristics. For many embodiments, this is accomplished by initially dividing at least the portion of the body in the medium into at least three sections intersecting at junctions, with at least selected sections being flexible in a direction perpendicular to the direction D. The sections in at least the rear third of the body should be flexible, with all of the sections being flexible for some embodiments. The sections which flex are driven to produce a wave-like motion having a frequency f, a wavelength λ of between 0.5 L and 2.0 L, a reduced frequency value Ω between 0.1 and 0.5 and a time delay for each successive junction between the junctions reaching successive peaks for their flex motion which is directly proportional to the distance $x_i$ in a direction D of the junction from a reference point and inversely proportional to the phase speed $c_p$ of the wave. The phase speed $c_p$ may be substantially the same for all junctions or may vary in a selected way from junction to junction. Optimum drag reduction occurs when the phase speed is greater than U, and in particular for phase speeds between and 1.5 U; however some drag reduction can be achieved phase speeds which under some conditions may be as l 0.5 U, and significant drag reductions can be achie phase speed up to 2 U and beyond.

The body has a head end in the direction of moti ⎯ a tail end opposite the head end, with a foil being ⎯ted to the tail end for preferred embodiments in a manner so as to be able to independently flap relative thereto. The foil, which is flapped relative to the tail end at a frequency substantially equal to the frequency f, has both a pitch motion and a transverse motion, the pitch motion preferably leading the transverse motion by a phase angle $\psi_p$ between 70° and 120°. The maximum induced angle $\alpha_0$ for the foil is normally between 10° and 25° and is preferably equal to $Q(t)_{max}$, where:

$$Q(t) = \operatorname{acrtan}\left(\frac{v_T(t)}{U}\right) - \theta(t)$$

The invention also involves a reduced drag body which is formed and flexes as indicated above. The body is preferably covered by a skin which is substantially impermeable to the medium and which bends smoothly, the outer surface of the skin being substantially smooth for preferred embodiments. For preferred embodiments, the body includes a flexible backbone extending along the length thereof and a structure mounted on the backbone for supporting the skin. The structure on the backbone may be a plurality of ribs mounted along the backbone, with each rib having a shape substantially matching the shape of the body at the point in its length where the rib is mounted. Alternatively, the structure may be a helical coil mounted over the backbone.

The sections of the body may be links connected at the junctions in a manner so as to be able to permit flexure at the junction in the direction perpendicular to the direction D, the drivers for such embodiments causing periodic rotation at the junctions. Alternatively, the body may have a flexible backbone extending along its length, with the junctions being defined by bulkheads along the backbone. For these embodiments, the drivers include components, for example muscle-like structures, which periodically vary the distance between at least selected ones of the bulkheads on two opposite sides of the backbone to effect the flexing wave like motion.

The body may be human powered, with a person positioned in a forward section thereof and the drivers being designed to be powered by such person. For other embodiments, the drivers may include at least one motor mounted in the body to cause flexures at the junctions by causing rotation thereof, with a separate motor being provided for each junction for some embodiments. For one embodiment, at least two of the bodies are utilized as pontoons for a catamaran boat, the drivers for the bodies being synchronized so as to flex substantially 90° out of phase with each other, thereby preventing the drives from inducing a sidewise motion to the boat. For an embodiment such as this one, or for embodiments where the body is being towed, motors for providing the flexure wave-like motion may be mounted outside the body, with motion being provided by suitable elements extending into the body. The body may also be designed with an outer "skin" at least the rear portion of which is flexed, while having a inner core which is not flexed.

While the operation described above is in conjunction with steady state operation, similar operation occurs when motion is not stable, such as during acceleration, deceleration or turns. However, during such unstable operation, amplitudes of motion may not be constant, but instead may be transient and asymmetric.

The foregoing and other objects, features and advantages of the invention will be apparent from the following more particular description of preferred embodiments of the invention as illustrated in the accompanying drawings.

DETAILED DESCRIPTION

Figure 5:
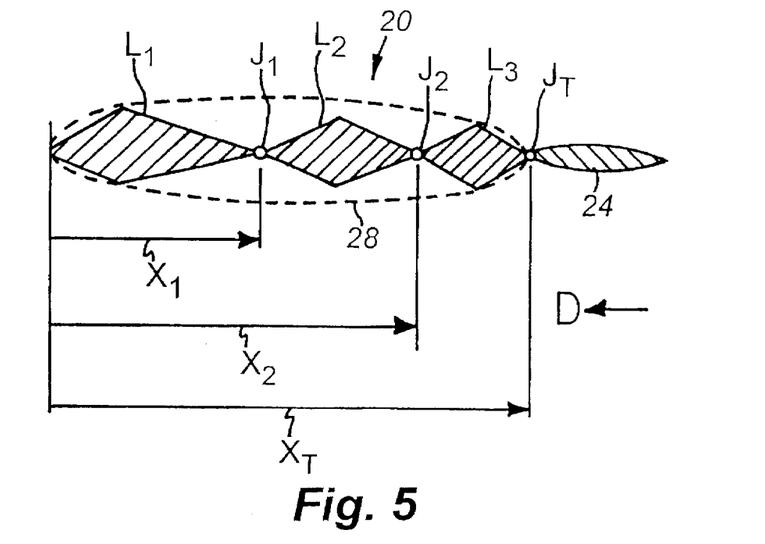
FIG. 5 is a simplified diagram for an embodiment of the invention generally of the type shown in FIG. 1.
Figure 6A:
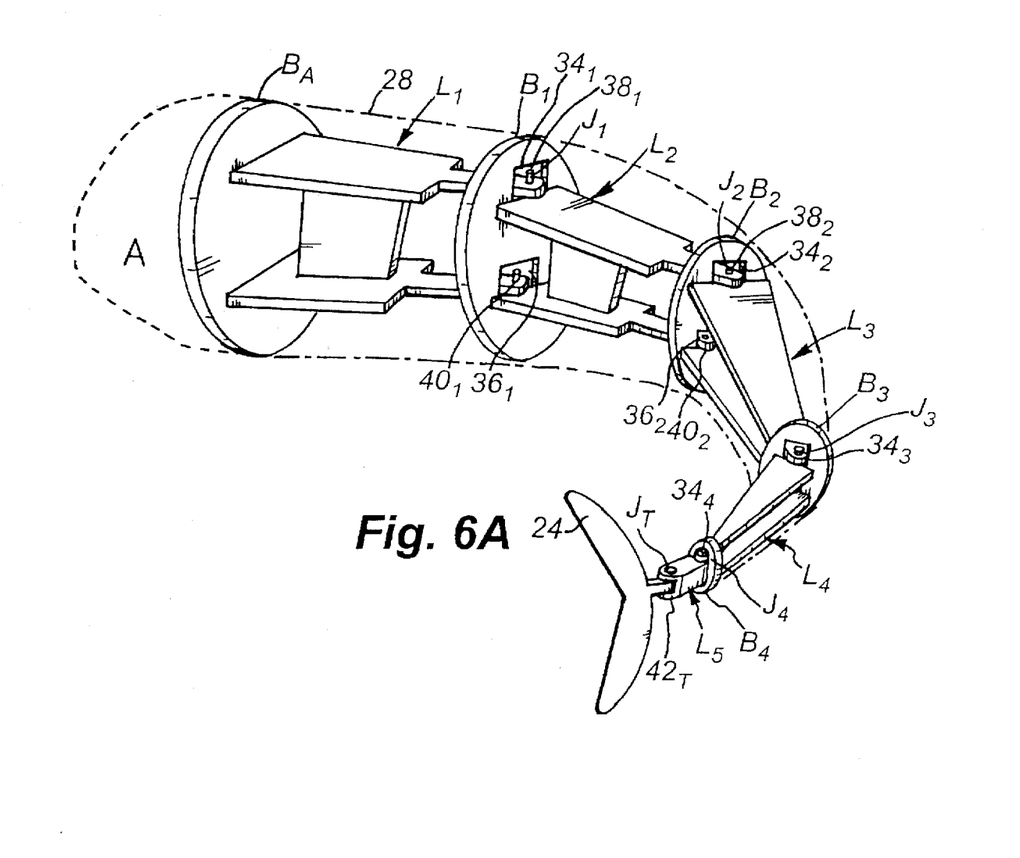
FIGS. 6A and 6B are a side perspective view and a top view, respectively, for a particular species of the embodiment of FIG. 5.
Figure 6B:
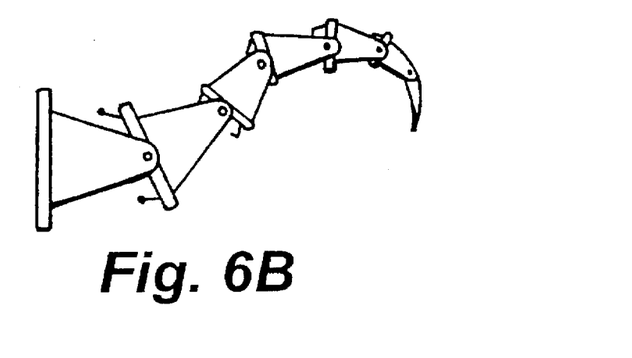

FIG. 5 illustrates a first general configuration or embodiment of the invention. In FIG. 5, the body 20 is divided into a plurality of sections or links $L_1$–$L_3$ with a junction $J_1$–$J_2$ being formed between links $L_1$ and $L_2$ and $L_2$ and $L_3$, respectively, and with a flapping foil 24 connected to a junction $J_T$ at the tail T of the body. Each joint $J_i$ is hinged so as to permit relative rotation between adjacent links at the junction about the axis for the link shown in FIG. 5. Each junction $J_i$ is spaced by a distance $x_i$ from the nose of the body as shown in the figure and, as will be discussed in greater detail later, the length of each link in the direction of travel D is preferably greatest for link $L_1$ at the front of the body and decreases for each link proceeding toward the tail of the body. FIGS. 6A and 6B illustrate one possible implementation for the embodiment shown in FIG. 5. For this embodiment, a bulkhead $B_A$ is formed at the front or fore end of link $L_1$ with a tapered nose cone A preferably extending from the front of this bulkhead. Each junction $J_1$–$J_4$ also has a bulkhead thereat which bulkhead has a pair of hinged openings $34_1$–$34_4$ and $36_1$–$36_4$ formed therein, with a hinged axis $38_1$–$38_4$ and $40_1$–$40_4$ mounted in respective bulkhead openings and having portions of each adjacent link mounted thereover to form a hinge at the corresponding joint. Thus, as may for example be best seen in FIG. 6B, the links are free to rotate with respect to each other. Junction $J_T$ also has a hinged pin $42_T$ which connects link L5 with flapping foil 24. As will be discussed in greater detail later, a flexing motion may be imparted to the junctions $J_1$–$J_T$ and to the links therebetween in a variety of ways.

Figure 1:
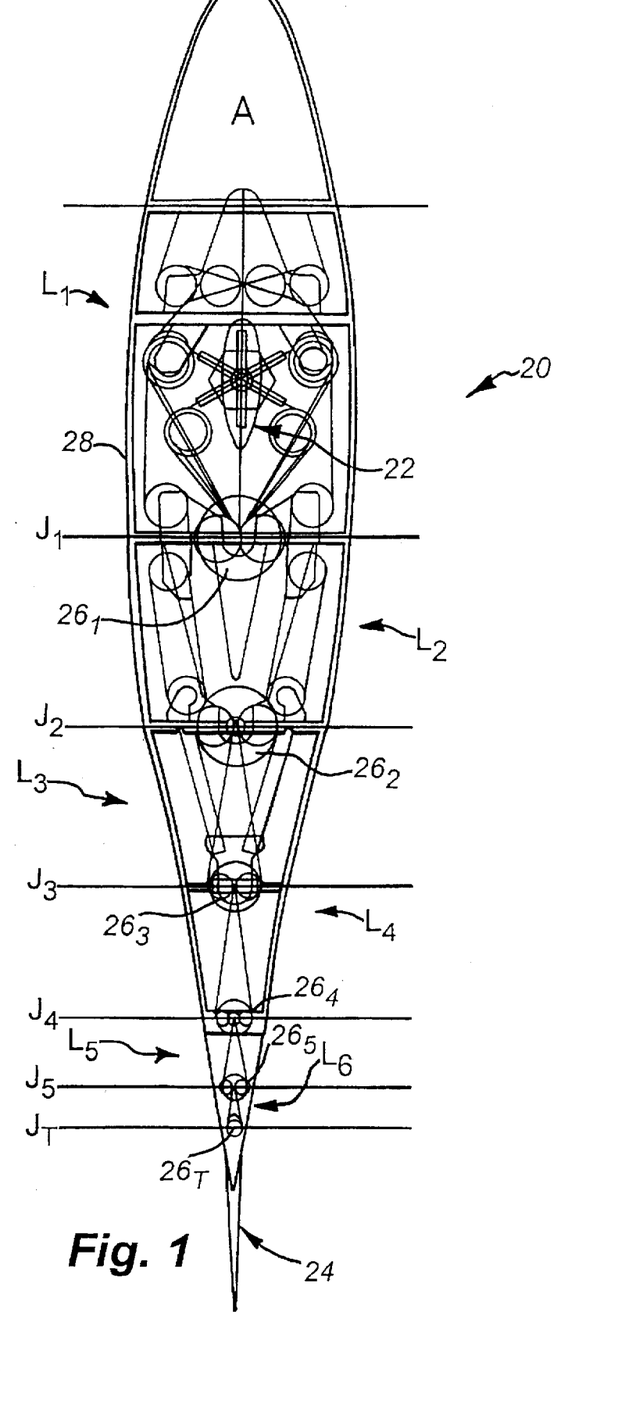
FIG. 1 is a top cutaway view of one embodiment of a reduced drag body in accordance with the teachings of this invention.

FIG. 1 illustrates another implementation for the embodiment of FIG. 5 which implementation has been built and tested. For this implementation of the invention, the body 20 is designed to be towed underwater through a strut 22 attached to a support or driving craft (not shown). The body 20 is divided into six sections or links $L_1$–$L_6$, plus a rigid front cone section A. Link $L_1$ is attached to strut 22, and links $L_2$–$L_6$ extend behind link $L_1$. A flapping foil 24 is also provided which is attached to joint $J_T$ at the tail end of body 20. There are six motors, one for each of the joints $J_1$–$J_T$ which, for the embodiment of FIG. 1, are positioned in and controlled from the support craft and which cause flexing of joints $J_1$–$J_T$ via strings passing through strut 22 and over various pulleys to a pulley $26_1$–$26_T$ located at the corresponding joint. From FIG. 1 it is seen that the links decrease in size in accordance with some predetermined pattern proceeding toward the rear of the body, this being true because larger movement at the rear of the body is required in order to reduce or substantially eliminate turbulence and therefore significantly reduce drag on the body.

Figure 2:
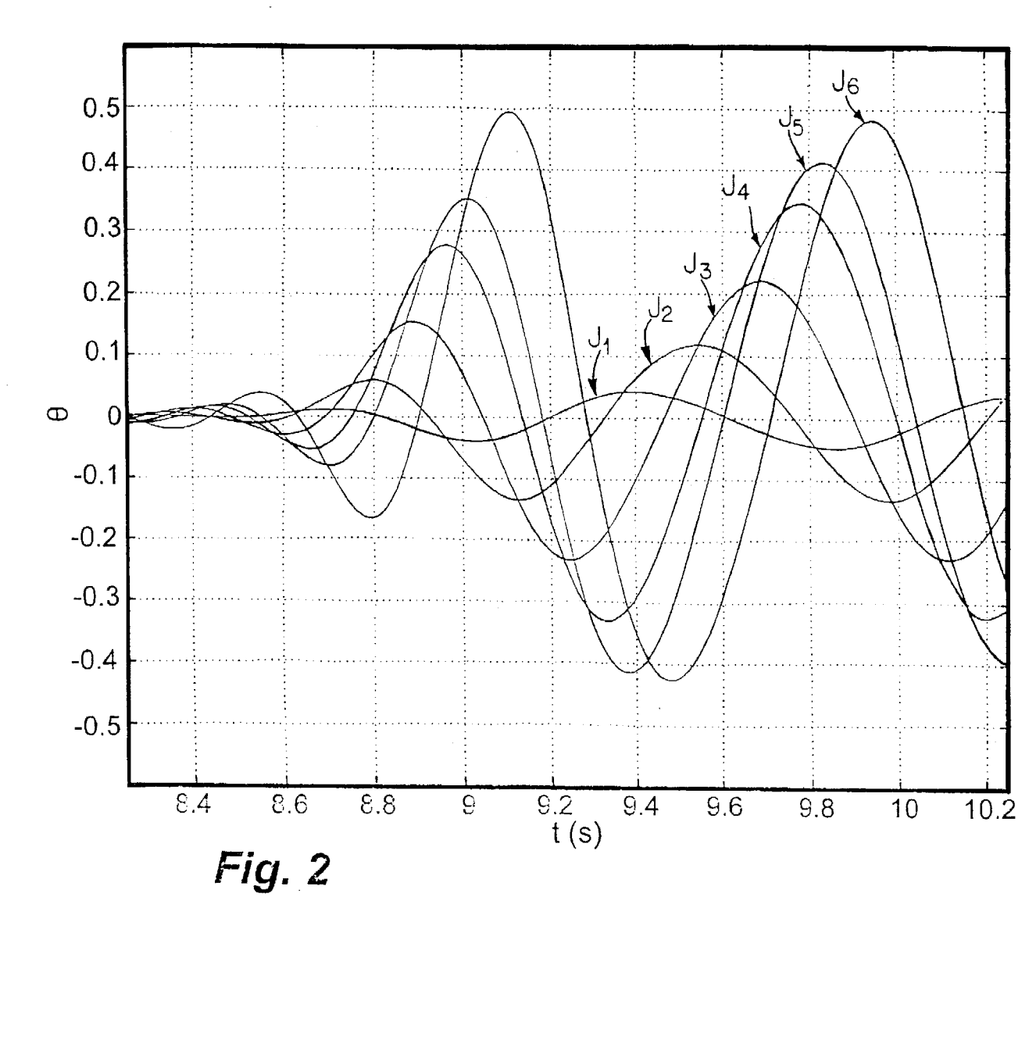
FIG. 2 is a diagram illustrating measured rotation θ during start-up for six flexing junctions of the body shown in FIG. 1 as a function of time.

The joints $J_1$–$J_T$ are rotated or flexed to impart a wave-like motion to the rear portion of body 20, this motion having a frequency f, a wavelength $\lambda$, and a period T which is normally substantially the same for all joints. However, as may be seen from FIG. 2, the amplitude of movement for the successive joints increases as the wave progresses toward the tail of the body. The curves of FIG. 2 are waveshapes verses time at startup for the joints $J_1$–$J_T$ respectively. Once steady state is established, the waveshapes smooth out with substantially the shapes shown for the right most portion of the waveforms.

Figure 3:
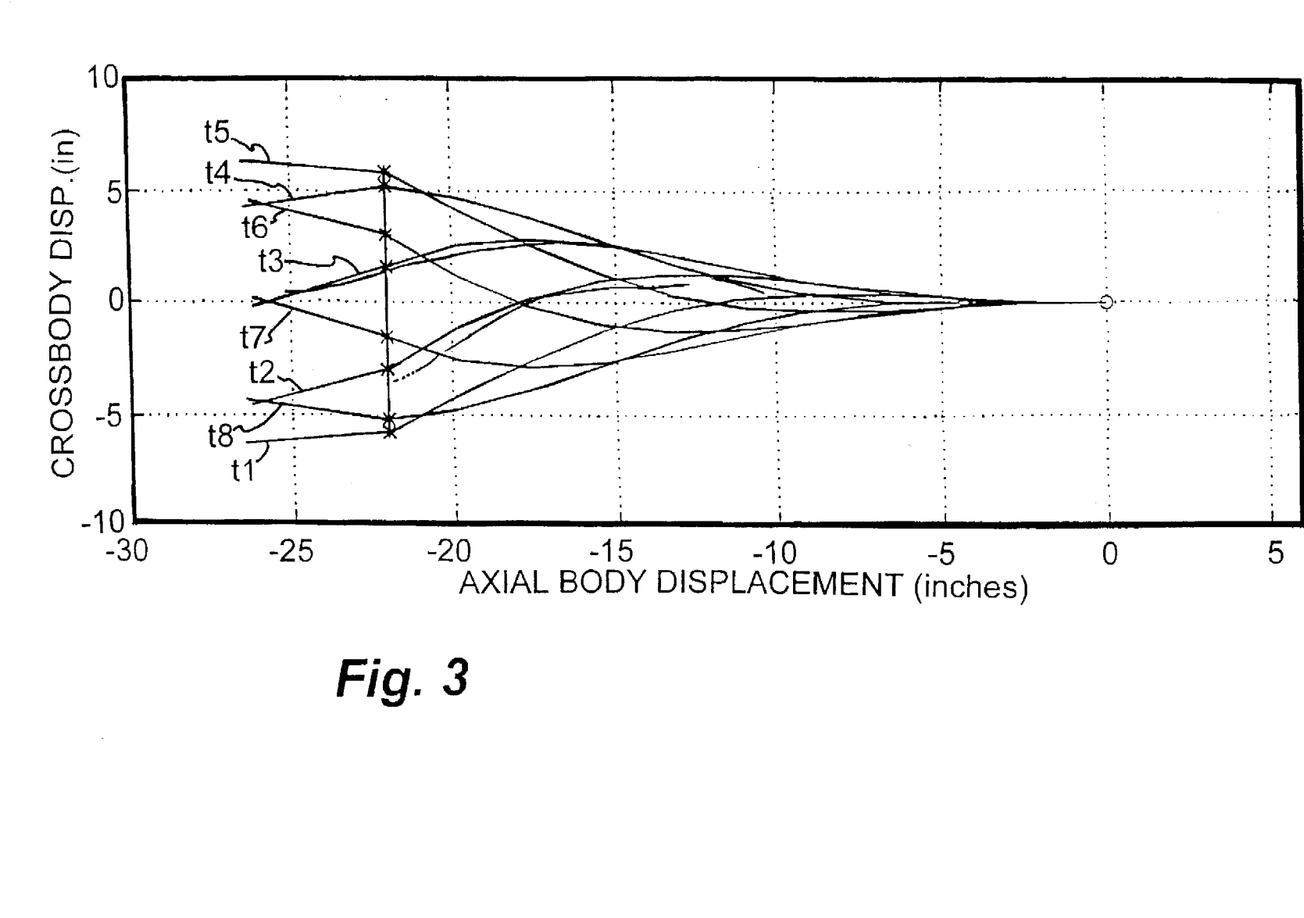
FIG. 3 is a diagram illustrating traveling waves as a function of time for the body shown in FIG. 1 as seen when moving with the body.
Figure 4:
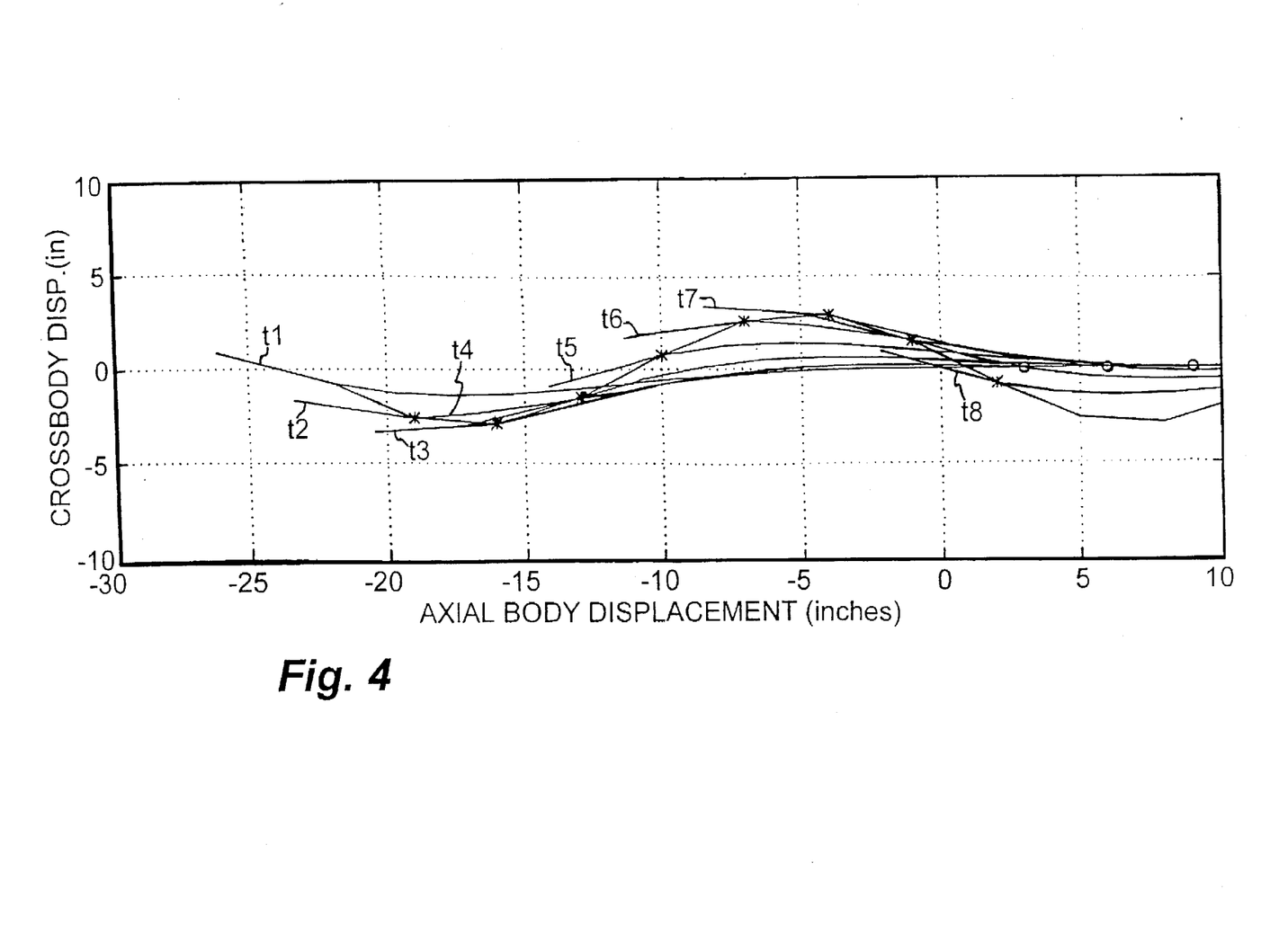
FIG. 4 is a diagram illustrating a traveling wave moving along the body of FIG. 1.

FIGS. 3 and 4 are of perhaps greater value in that they illustrate the wave motion at various points in time along the axis of the body 20. For FIG. 3, the waveforms are with respect to an observer positioned on the nose of the body (i.e. at the front end of Section A), the lines being at successive time intervals as marked. FIG. 3 clearly illustrates the wave motion moving to the right. FIG. 4 is a similar diagram showing the traveling wave moving to the right as viewed by a stationary observer at for example point 0.

In order to achieve reduced drag, the wave-like motion of the various sections or links must satisfy certain criteria. First, the flexing of the body must be for at least the rear third of the body since this is the portion of the body where turbulence generally forms, the turbulence resulting at least in part from the fact that this portion of the body is not as streamlined as the forward end. However, the location on the body where turbulence begins will vary somewhat with the shape of the body. It is therefore desirable to have flexing for as much of the body as possible, consistent with other requirements on the system, with flexing of rear portion being most critical.

Second, since flexing only results in drag reduction when there is turbulence, flexing is normally not performed at speeds/Reynolds numbers $R_e$ below those at which turbulence begins (for less than an $R_e$ 400,000–500,000). However, as indicated earlier, since these values are exceeded at almost all speeds which are practical, the drag reduction techniques of this invention would typically always be employed when the body is in motion. The wavelength for the traveling wave is preferably between 0.5 L and 2.0 L, where L is the length of body 20 without foil 24. Two other parameters which are important for the traveling wave are the phase speed of the traveling wave $c_p$ which may for example be expressed in meters per second and is obtained by the equation:

$$c_p = \frac{\omega}{k}$$

where $\omega$=the angular frequency in radians per second of oscillation, $\omega=2\pi/T$.

k=wave number, $k=2\pi/\lambda$

T=period of oscillation in seconds $\lambda$=wavelength of oscillation in meters.

f=frequency of oscillations in Hz

In substantially all instances, the phase speed $c_p$ should to achieve optimum drag reduction be greater than the forward speed of the body (U), and $c_p$ is preferably between U and 1.5 U. However, in some applications, drag reduction which may for example be in the 5% range (as opposed to the 50% to 75% range with $c_p$ in the preferred range) may be achieved for a $c_p$ as low as 0.5 L, and significant drag reduction can be achieved for a $c_p$ of up to 2 L and beyond. Further, for preferred embodiments, the phase speed $c_p$ is substantially the same for all of the junctions $J_1$–$J_T$. However, this is not a limitation on the invention and the phase speed at the junctions may vary in a selected way; however, the phase speeds for all of the junctions should still fall within the preferred ranges indicated above.

Another important value in drag reduction is the reduced frequency value $\Omega$ which is defined as:

$$\Omega = fA/U$$

where A is the maximum lateral excursion (i.e. the maximum heave motion) of the tail of body 20 (i.e. junction $J_T$) in a direction perpendicular to the direction D of travel. Since, as may be seen for example from FIG. 2, junction $J_T$ has a greater lateral movement than any other junction, A is therefore also equal to the maximum lateral excursion of the body in such perpendicular direction. As indicated previously, for preferred embodiments the reduced frequency value $\Omega$ is between 0.1 and 0.5.

Figure 7:
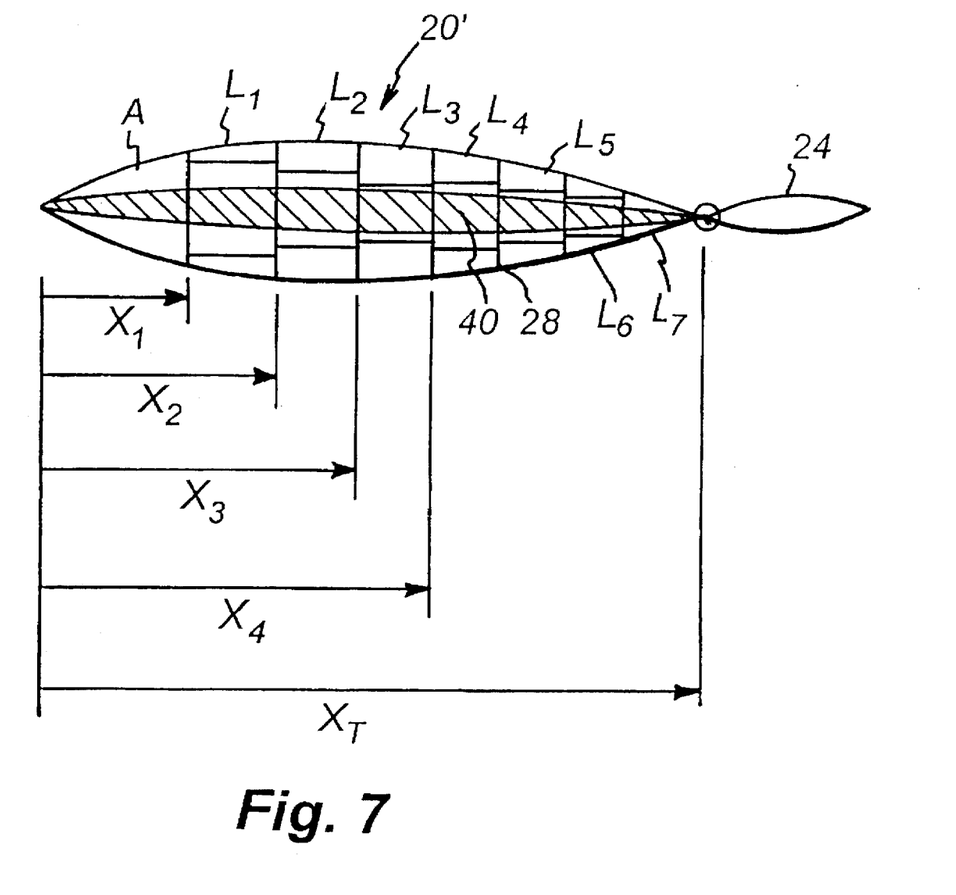
FIG. 7 is a simplified diagram for an alternative embodiment of the invention.

Perhaps most important, wavelike motion results in a time delay for each successive junction $J_1$–$J_T$ reaching the peak for its flex motion, which time delay may for example be best seen in FIG. 2. For preferred embodiments, this time delay for a given junction is directly proportional to the distance $x_i$ of such junction from a reference point, which reference point, referring to FIGS. 5 and 7, is the front tip of the body for preferred embodiments. However, other reference points are possible. The delay is also inversely proportional to the phase speed $c_p$ of the wave at the junction (remembering again that while $c_p$ is normally the same for all junctions, it may in some applications vary in a selected way from junction to junction.) While the body will flexed in a harmonic transverse motion which is norm substantially sinusoidal as shown in the Figures, this a limitation on the invention, and all that is required the motion at a given point be periodic at the frequ The transverse motion of a given junction, denote will be periodic with a period T, and will have a amplitude $A_i$ which is a function of its position $x_I$ from the reference point. Typically, as shown in the Figures, $A_i$ grows from the nose of the body to its tail. This increase may be linear, quadratic, exponential or based on some other selected relationship, for example $A_i$ may be defined by the following equation:

$$A_i = a_0 + a_1 x_i + a_2 x_i^2$$

Alternatively, the $a_0$ term in the above equation may be dropped. $a_0$ were used and $a_1$, $a_2$ are constants which can be chosen based on a given wave frequency f, body speed U and other parameters. There is some latitude in selecting the defining equations and the parameters/constants for such equations. The maximum $A_i$ amplitude occurs for $A_T$ and may be up to 0.3 L, with a preferred value of 0.2 L.

It should be noted that all of what has been said above is for the steady state propulsion mode. Where rapid or slow maneuvering action is to be taken, for example during acceleration or deceleration or during turns, the motion can involve a large bending of the body which, while still a waveshape, may vary in speed and amplitude from the values provided above. The waveshape may also be transient and asymmetric during such periods (see FIG. 2). However, the traveling wave motion is maintained, and the values provided above are reestablished once the body returns to steady state operation.

The motion of foil 24 is related to the flexing motion of body 20, for example being at the same frequency f, but is performed independent of the body flexing and is not part of the traveling wave for the body. Foil 24 has both heave motion and pitch motion, the heave motion being determined by the movement $y_T$ of the tail junction $J_T$, while the pitch motion is determined by for example the movement of pulley $26_T$. For preferred embodiments, this pitch motion leads with respect to the transverse motion of the junction $J_T$ by a phase angle, denoted $\psi_p$, of between 70° and 120°, with a preferred value of approximately 75°. Further, with a flapping foil, the angle of attack for the foil relative to the direction of travel should be between 5° and 25° with a preferred value of 18°.

Finally, the maximum pitch amplitude $\theta_{max}$, which is the maximum pitch amplitude for the junction $J_T$, is selected such that the maximum induced angle of attack $\alpha_0$ has a value between 10° and 25°. The exact value of $\alpha_0$ is found by finding the maximum value of a quantity Q(t) which quantity is defined as follows:

$$Q(t) = \operatorname{acrtan}\left(\frac{v_T(t)}{U}\right) - \theta(t)$$

$Q(t)_{max}$ must be found numerically by searching all values of Q(t) from t=0 to t=T.

In the above equation, the $v_T(t)$ denotes the transverse velocity of the tail (i.e. of junction $J_T$) which is given as:

$$v_T(t) = dy_T(t)/dt; \text{ (which for sinusoidal motion)} = -\omega A_T \sin(\omega t - \psi_T)$$

Figures 8, 9A, 9B:
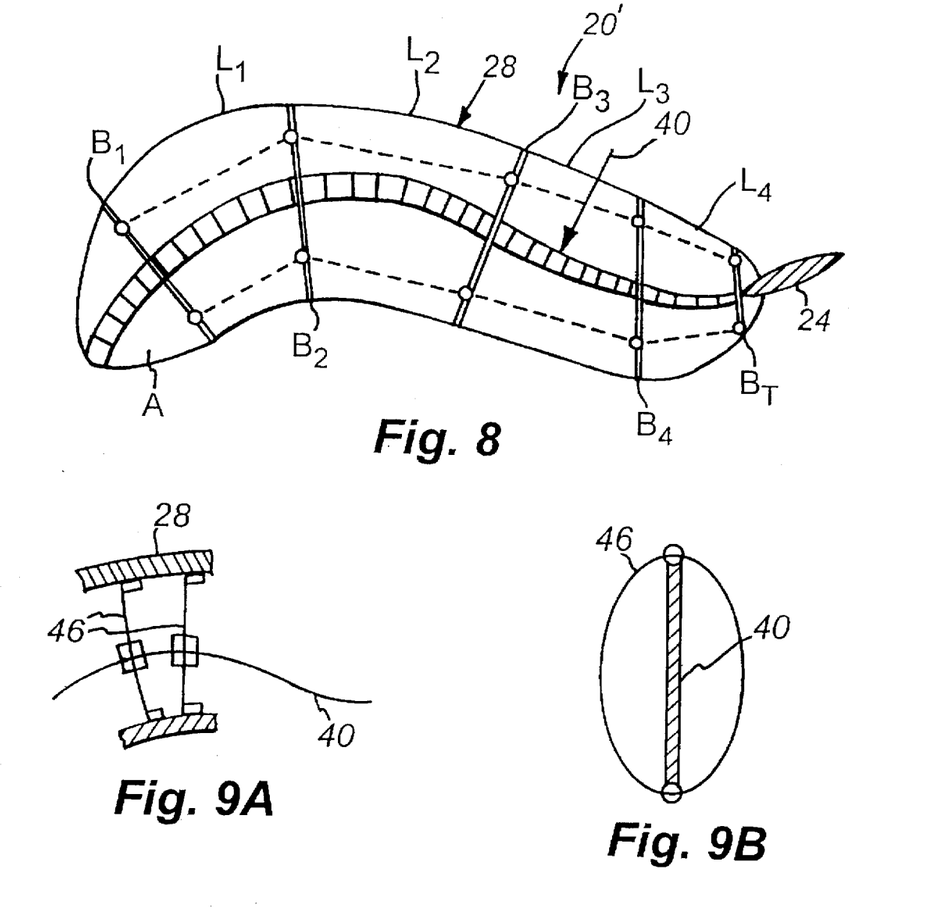
FIG. 8 is a more detailed diagram for this alternative embodiment.
FIGS. 9A and 9B are a side sectional view and a rear view, respectively, for one embodiment of a skin support structure for the various embodiments of the invention.

FIGS. 7 and 8 illustrate a body 20' for an alternative embodiment of the invention wherein the plurality of sections or links $L_1$–$L_T$, the number of which links may vary from embodiment to embodiment, have a flexible spine 40 extending therethrough. Spine 40 may be formed as for example a flexible beam. The spine is preferably able to flex in only one direction and is resilient to return to its original shape, for example straight, when no flexure force is applied thereto. A plurality of bulkheads $B_1$–$B_T$ are attached to spine 40 at selected points along its length to define the lengths of the sections. As for the first embodiment, the number of links may vary, with as few as two links being possible, but with three to seven links being preferred. For a very long body, a greater number of links may be desirable. The length of the links also varies, generally decreasing for successive links progressing from the head to the tail. As for the prior embodiment, this facilitates the desired greater curvature of the body at the tail.

The intermediate bulkheads are connected by muscle-like or other suitable activators 42, with each such bulkhead being connected by the activators to at least its two adjacent bulkheads and possibly more. The first and last bulkheads $B_1$ and $B_T$, are however only attached by activators 42 on one side. The activators 42 contract and expand in a selected pattern to impose relative motion between the bulkheads, the backbone 40 providing for smooth flexing. Actuators 42 may for example be formed of an elastomeric material which expands and contracts in response to electric current applied thereto. The electric currents to be applied to actuators 42 may be obtained from one or more batteries under control of a suitable control circuit. Alternatively, activators 42 may be hydraulically controlled, pneumatically controlled, or may include small motor-operated pulleys for shortening the length of the connection between bulkheads $B_i$. Spine 40 may be used to return the activator to full length or the drive component may drive in both directions. Depending on application, control circuitry for the actuators, regardless of form, may be actuated by an operator onboard the body, may be preprogrammed to provide some selected motion or, where the body is a drone, may be remotely radio-controlled from for example a boat tracking the body. Foil 24 may be independently flapped by a motor or other suitable drive mechanism which may be similarly controlled.

Figure 10A:
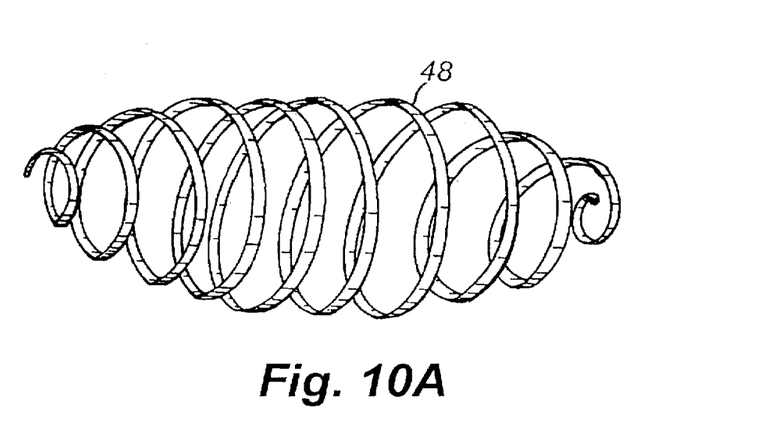
FIG. 10A is a perspective view of a helical coil which may be utilized in conjunction with a skin support structure for another embodiment of the invention.
Figure 10B:
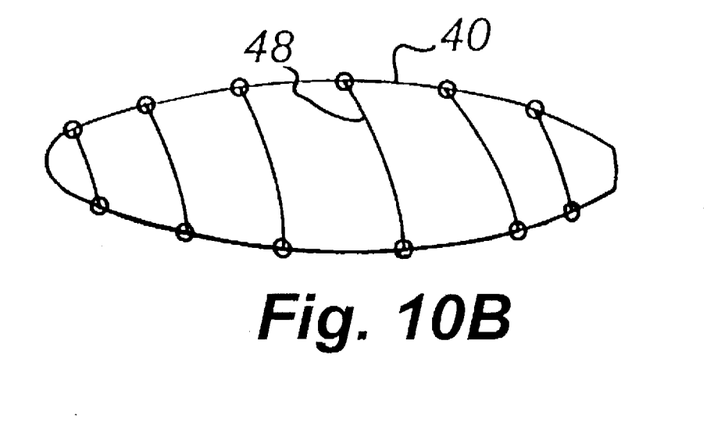
FIGS. 10B and 10C are a side view and a sectional view, respectively, of a skin support structure utilizing the helical coil shown in FIG. 10A.
Figure 10C:
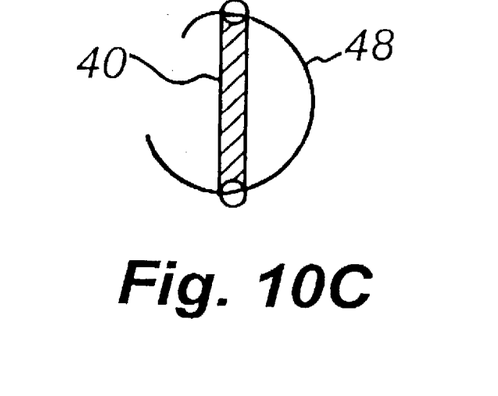

All of the bodies, 20, 20' are shown as being covered by a skin 28. The skin may be supported on the body in a number of ways, FIGS. 9A, 9B illustrating one such way and FIGS. 10A–10C illustrating another such way. In FIG. 9A, a backbone or spine 40 is provided which may be the same as the spine 40 for the embodiments of FIGS. 7 and 8 or may be a different backbone. A plurality of ribs 46 are attached to backbone 40, each rib 46 having a shape which corresponds to the desired cross-section for the body at that point along the length of the body. FIG. 9B illustrates one such cross-section. Skin 28 is stretched over the ribs and is formed of a material which is impervious to the medium in which the body moves (i.e., is waterproof) and which bend smoothly. The skin preferably also has a smooth outer surface. For preferred embodiments of the invention, the skin consists of an impermeable latex skin over a padded foam. The ribs 46 should be densely enough packed so as to prevent significant sagging of the skin. For the embodiment of FIGS. 7 and 8, the bulkheads $B_1$–$B_T$ may function as ribs in addition to the ribs 46.

FIGS. 10A–10C show an alternative embodiment of the invention wherein a helical or spiral coil 48 of a metal or other suitable material having an outer diameter at various points along its length corresponding to the desired shape of the body at such points is connected to backbone 40 as shown in FIGS. 10B and 10C. The skin 28 may then be stretched over coil 48.

Figure 11A:
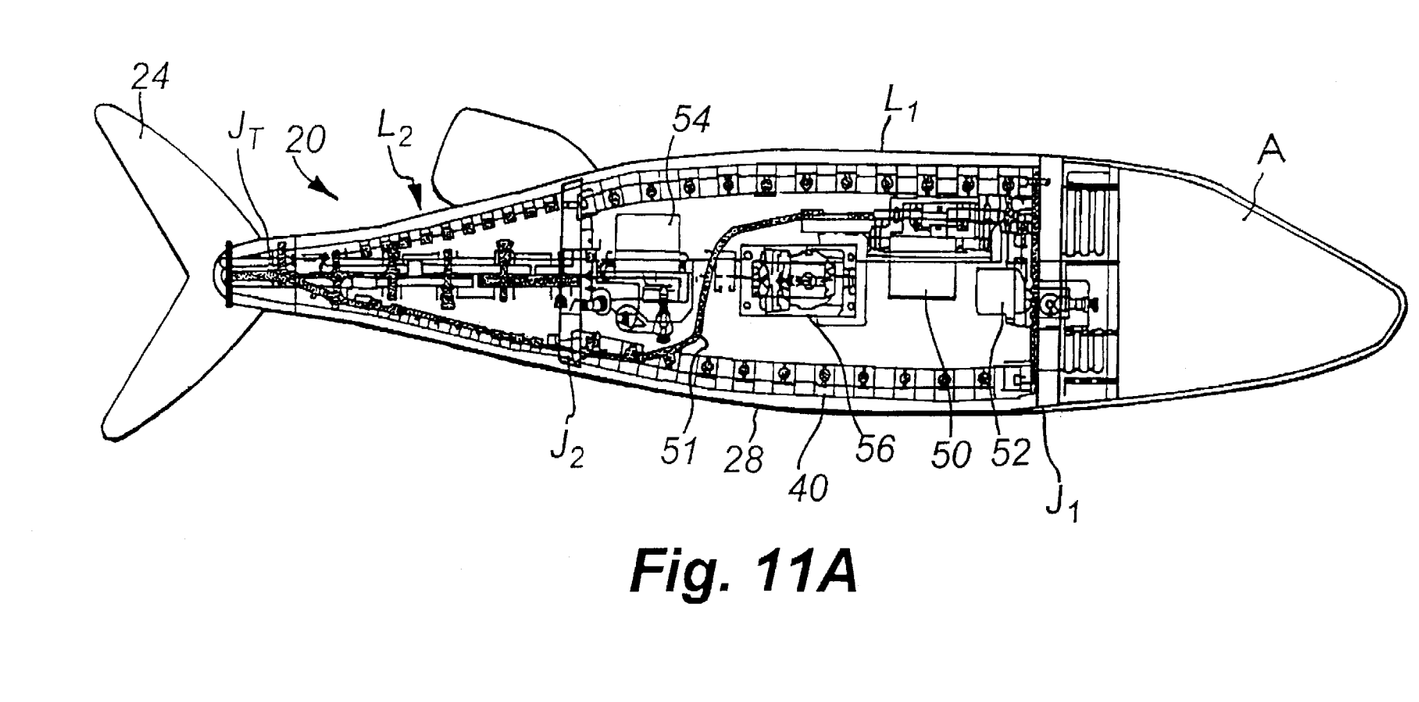
FIGS. 11A and 11B are a sectional side view and a sectional top view, respectively, for another species of the embodiment shown in FIG. 5.
Figure 11B:
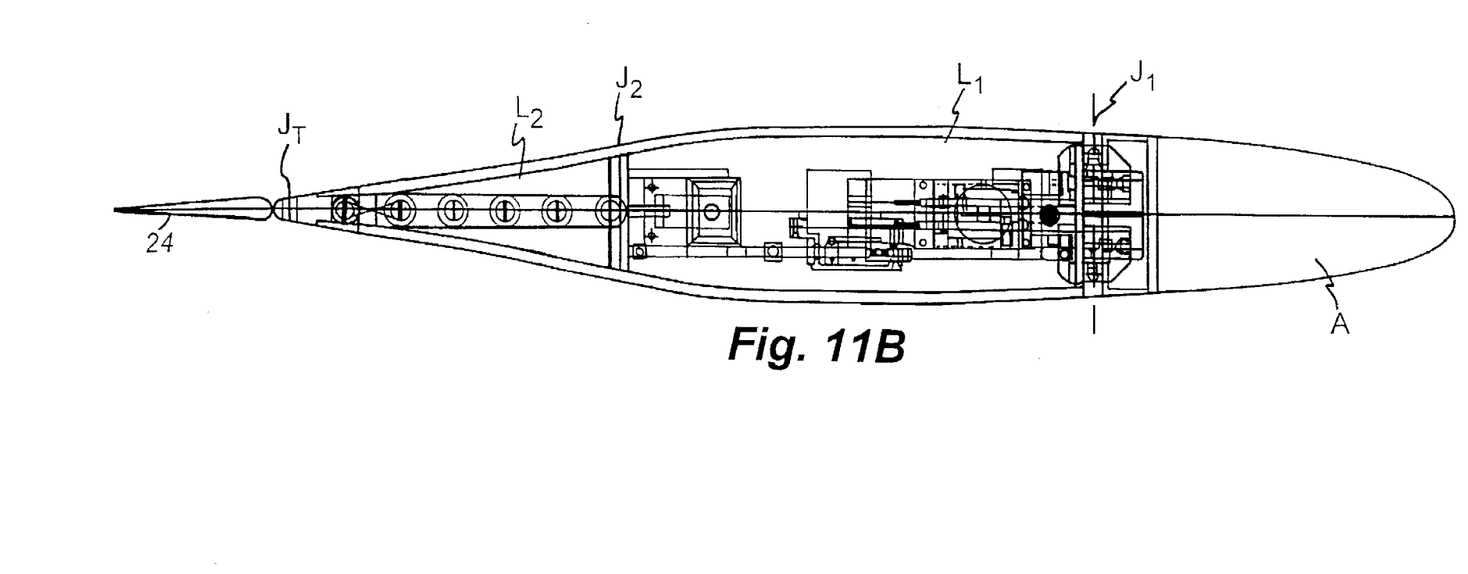

FIGS. 11A and 11B show another species of the FIG. 5 embodiment which differs from the species of FIG. 1 in that the body 20 is internally powered rather than being powered from outside the body. In particular, the embodiment of FIGS. 11A and 11B has only three sections, a nose section A, a center section $L_1$ and a rear section $L_2$. Flapping foil 24 is connected to a junction $J_T$ at the tail end of the body and is flapped under control of a motor 50 which operates foil 24 through a cable 51. Motors 54 and 56 control rotation at the joints $J_1$ and $J_2$ respectively and a motor 52 provides power for stabilizing fins. Controllers for properly controlling and sequencing the operation of the various motors are placed in nose cone A. FIG. 11A also shows spine 40 with skin 28 stretched thereover.

Figure 12:
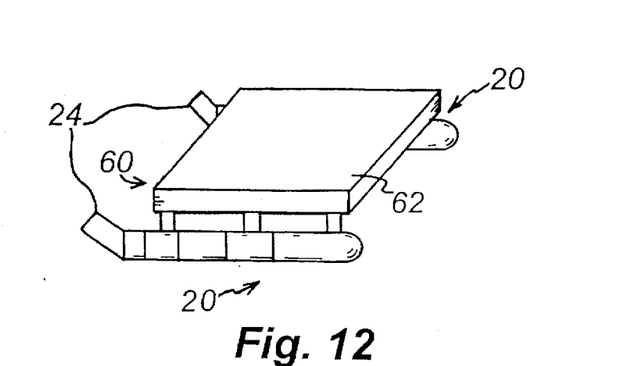
FIG. 12 is a perspective view of a catamaran boat employing two flexing reduced drag bodies of this invention.

FIG. 12 shows a catamaran boat 60 having two of the bodies 20 as pontoons, with a platform or stage 62 supported on the pontoons. The catamaran may have a more complicated stage structure than that shown in FIG. 12, but for purposes of illustration platform 62 suffices. Each body 20 has a flapping foil 24 for propulsion. The bodies 20 are synchronized so that the traveling waves for the bodies are 90° out of phase with each other and the flapping foils 24 are also 90° out of phase. This assures against sidewise movement of the boat by the flexing and flapping motions. The advantage of a construction such as that shown in FIG. 12 is that substantially the entire portion of the boat which is in water may have the traveling wave flexing motion without causing flexing motion for the portion of the boat carrying passengers.

Figure 13:
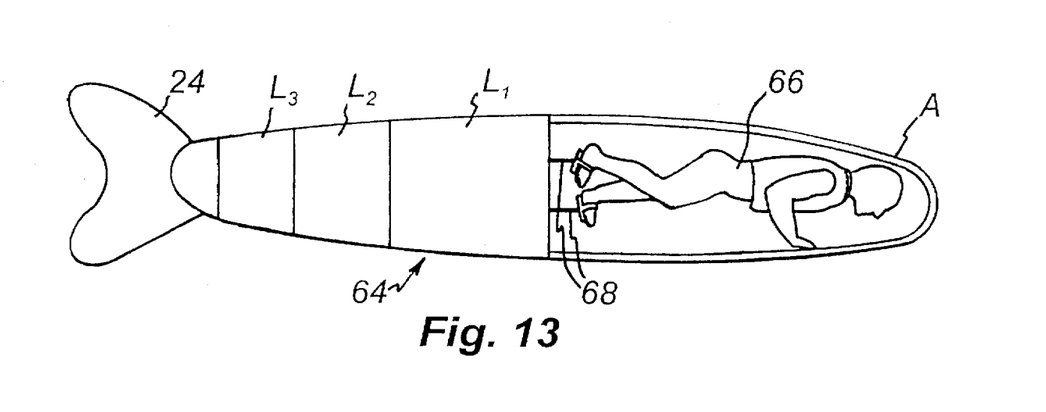
FIG. 13 is a partially cut-away side view of a human powered body in accordance with the teachings of this invention.

FIG. 13 illustrates a body 64 which is preferably of the type shown in FIG. 5 but which is designed to have a person 66 positioned in the nose A of the body. The person operates a suitable mechanism 68 with his legs or feet to cause both the flexing of the body and the flapping of foil 24 to propel the body through the water. Since this construction provides very little drag on the body, the individual may travel for substantial distances under water without fatigue for recreation, underwater exploration or other purposes.

Another application in which this invention may be utilized is for undersea drone crafts which are used for undersea exploration or monitoring. As indicated earlier, such craft may either be preprogrammed, for example in an on-board processor, or the on-board processor may contain a radio receiver for receiving and processing instructions provided by a person on a surface craft.

Figure 14:
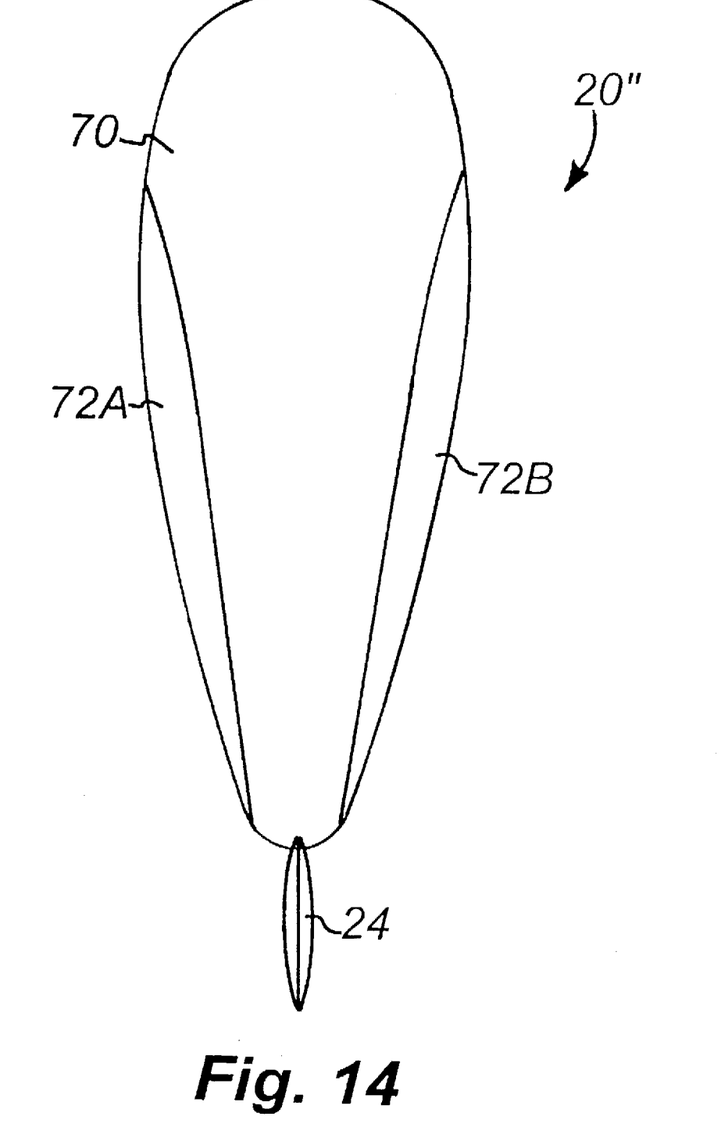
FIG. 14 is a partially cut-away top view of another alternative embodiment.

FIG. 14 illustrates still another embodiment of the invention which is different from that of either FIG. 5 or FIG. 7 and which provides some of the same advantages as that of FIG. 12. For this embodiment, the body 20" has a central core 70 which is not flexed and an outer "skin" 72A, 72B over at least the rear portion of the body. The outer surface of body 20" over skins 72 may be provided with a flexing motion by causing periodic expansion and contraction of skin portions 72A and 72B which flexures are preferably 90° out of phase with each other so as to provide the desired wave-like motion. The flexing motion in skin portion 72A and 72B may for example be achieved by periodically forcing an air bubble through the skin sections, with the sections normally being filled with a liquid, the air bubble passing out the rear of the skin, by mechanical means or by other suitable mechanisms. Other suitable mechanisms for imparting a wave-like motion to the outer surfaces of at least the rear portion of a body might also be utilized.

A method and apparatus is thus provided which should be able to reduce drag on a body in a fluid such as water by approximately 50% for Reynolds numbers between 500,000 and 1,000,000 and by approximately 75% for Reynolds numbers above 1,000,000. The exact amount of drag reduction at a given Reynolds number will vary depending on a variety of factors including the shape of the body and the parameters of operation.

While for preferred embodiments, the vessel has been shown as being driven by a flapping foil, and this is the preferred form of propulsion for the reduced drag bodies of this invention, this is not a limitation on the invention and other forms of propulsion known in the art might be utilized while still achieving some measure of drag reduction. Further, while the body is moving in water for preferred embodiments, movement in air or other fluid media is also possible. Thus, while the invention has been described above with reference to a variety of embodiments, it is to be understood that these embodiments are provided for purposes of illustration only and that the various modifications in these embodiments discussed above and others may be made by one skilled in the art without departing from the spirit and scope of the invention.

What is claimed is:

1. In a body having a length L being moved in a direction D through a selected fluid medium at a speed U sufficient to normally cause turbulence, a method for reducing drag on the body comprising the steps of:

dividing at least the portion of the body in the medium into at least three sections having junctions therebetween, at least selected sections being flexible in a direction perpendicular to the direction D; and flexing the sections to produce a wave-like motion thereof having a frequency f, a wavelength λ of between 0.5 L and 2.0 L, a reduced frequency value Ω between 0.1 and 0.5, and a time delay between successive junctions reaching peaks for their flex motion which is directly proportional to the distance $x_i$ in the direction D of the junction from a reference point and inversely proportional to the phase speed $c_p$ of the wave.

2. A method as claimed in claim 1 wherein the phase speed $c_p$ is greater than U.

3. A method as claimed in claim 2 wherein the phase speed $c_p$ is a speed between U and 1.5 U.

4. A method as claimed in claim 2 wherein the phase speed $c_p$ is substantially the same for all junctions.

5. A method as claimed in claim 2 wherein the phase speed $c_p$ varies in a selected way from junction to junction.

6. A method as claimed in claim 1 wherein said body has a head end in the direction of motion and a tail end opposite said head end; and including a foil connected to said tail end in a manner so as to be able to independently flap relative thereto; and wherein the method includes the step of flapping the foil relative to said tail end at a frequency substantially equal to the frequency f.

7. A method as claimed in claim 6 wherein said foil has both a pitch motion and a transverse motion, the pitch motion being delayed with respect to the transverse motion by a phase angle $\psi_p$ between 70° and 120°.

8. A method as claimed in claim 6 wherein the maximum induced angle of attack for the foil is equal to $Q(t)_{max}$, where:

$$Q(t) = \operatorname{acrtan}\left(\frac{v_T(t)}{U}\right) - \theta(t)$$

9. A method as claimed in claim 8 wherein maximum induced angle of attack for the foil is between 10° and 25°.

10. A method as claimed in claim 1 wherein all of said sections are connected to flex relative to each section adjacent thereto; and wherein said motion involves all said sections.

11. A reduced drag body having a length L and designed to be moved in a direction D through a selected fluid medium at a speed U sufficient to normally cause turbulence, the body comprising:

at least three body sections for at least the portion of the body which is normally in the medium, said body sections intersecting at junctions, at least selected sections being flexible in a direction perpendicular to the direction D; and drivers for flexing the sections to produce a wave-like motion thereof having a frequency f, a wavelength $\lambda$ of between 0.5 L and 2.0 L, a reduced frequency $\Omega$ between 0.1 and 0.5, and a time delay for each successive junction between the sections reaching a peak for its flex motion which is directly proportional to the distance $x_i$ in the direction D of the junction from a reference point and inversely proportional to the phase speed $c_p$ of the wave.

12. A body as claimed in claim 11 wherein said body is covered by a skin which is substantially impermeable to said medium and which bends smoothly.

13. A body as claimed in claim 12 wherein the outer surface of said skin is substantially smooth.

14. A body as claimed in claim 12 including a flexible backbone extending along the length of said body; and a structure mounted on said backbone for supporting said skin.

15. A body as claimed in claim 14 wherein said structure is a plurality of ribs mounted along said backbone, each rib having a shape substantially matching the shape of the body at the point in the length where it is mounted.

16. A body as claimed in claim 14 wherein said structure is a helical coil mounted over said backbone.

17. A body as claimed in claim 11 wherein at least the sections in the rear third of said body are connected to flex relative to each other.

18. A body as claimed in claim 11 wherein said body has a head end in the direction of motion and a tail end opposite said head end; and including a foil connected to said tail end in a manner so as to be able to flap relative thereto; and a driver for independently flapping the foil relative to said tail end at a frequency substantially equal to the frequency f.

19. A body as claimed in claim 11 wherein said sections are links connected at said junctions in a manner so as to permit flexure at said junctions in said direction perpendicular to the direction D, and wherein said drivers cause periodic rotations at said junctions.

20. A body as claimed in claim 11 wherein said body has a flexible backbone extending along its length, with said junctions being defined by bulkheads along said backbone; and wherein said drivers include components for periodically varying the distance between at least selected ones of said bulkheads on two opposite sides of said backbone to effect said flexing wave-like motions.

21. A body as claimed in claim 11 wherein said drivers include at least one motor mounted in said body to cause flexure at said junctions.

22. A catamaran boat having at least two of the bodies of claim 11 as pontoons, the drivers for said bodies being synchronized so as to flex substantially 90° out of phase with each other.

23. In a body having a length L being moved in a direction D through a selected fluid medium at a speed U sufficient to normally cause turbulence, a method for reducing drag on the body comprising the step of:

flexing at least the outer surface of at least the rear portion of the body to produce a wave-like motion thereof having a frequency f, a wavelength $\lambda$ of between 0.5 L and 2.0 L, a reduced frequency value $\Omega$ between 0.1 and 0.5, and a time delay between successive points on the body reaching peaks for their flex motion which is directly proportional to the distance $x_i$ in the direction D of the point from a reference point on the body and inversely proportional to the phase speed $c_p$ of the wave.

24. A method as claimed in claim 23 wherein said body has a head end in the direction of motion and a tail end opposite said head end; and including a foil connected to said tail end in a manner so as to be able to independently flap relative thereto; and wherein the method includes the step of flapping the foil relative to said tail end at a frequency substantially equal to the frequency f.

* * * * *